United States Patent [19]

Taue et al.

[11] Patent Number: 5,660,155

[45] Date of Patent: Aug. 26, 1997

[54] FOUR-CYCLE ENGINE

[75] Inventors: Jun Taue; Shunzo Fujiwara, both of Iwata, Japan

[73] Assignee: Yamaha Hatsudoki Kabushiki Kaisha, Iwata, Japan

[21] Appl. No.: 531,732

[22] Filed: Sep. 21, 1995

[30] Foreign Application Priority Data

Sep. 22, 1994 [JP] Japan .................................. 6-254796

[51] Int. Cl.$^6$ .............................. F02B 75/18; F02B 75/02
[52] U.S. Cl. ........................................ 123/184.54; 123/572
[58] Field of Search ............................. 123/184.54, 572, 123/573, 317, 318

[56] References Cited

U.S. PATENT DOCUMENTS

| | | | |
|---|---|---|---|
| 3,810,454 | 5/1974 | Hunt | 123/184.54 |
| 4,356,798 | 11/1982 | Sakaoka et al. | 123/73 V |
| 4,422,415 | 12/1983 | Matsuo et al. | 123/184.54 |
| 4,475,510 | 10/1984 | Asaka et al. | 123/432 |
| 4,488,519 | 12/1984 | Kishida | 123/184.54 |
| 4,856,486 | 8/1989 | Mori et al. | 123/572 |
| 4,901,703 | 2/1990 | Humphries | 123/572 |
| 4,986,225 | 1/1991 | Wu et al. | 123/184.54 |
| 4,991,547 | 2/1991 | Davis et al. | 123/184.54 |
| 5,009,199 | 4/1991 | Macfarlane | 123/184.54 |
| 5,129,367 | 7/1992 | Lee et al. | 123/184.54 |
| 5,205,265 | 4/1993 | Kashiyama et al. | 123/572 |
| 5,253,614 | 10/1993 | Matsuo et al. | 123/184.53 |
| 5,501,203 | 3/1996 | Santi | 123/572 |

FOREIGN PATENT DOCUMENTS

| | | | |
|---|---|---|---|
| 58-160514 | 9/1983 | Japan | 123/184.54 |
| 61-200326 | 9/1986 | Japan | . |
| 63-94027 | 4/1988 | Japan | 123/184.54 |

OTHER PUBLICATIONS

Research Disclosure, No. 352, 1 Aug. 1993, Emsworth GB, p. 539 XP000395263.

Primary Examiner—David A. Okonsky
Attorney, Agent, or Firm—Knobbe, Martens, Olson & Bear LLP

[57] ABSTRACT

An engine induction system having a check valve upstream of the intake port for precluding reverse flow. A plenum device is communicated with the induction system downstream of the check valve for reducing inertial effects and improving charging efficiency. The plenum device may be the crankcase chamber of the engine. In that case crankcase ventilation may also be controlled and improved. Crankcase supercharging may also be generated. These features may be combined with variable valve timing to further improve engine performance.

27 Claims, 6 Drawing Sheets

FOUR-CYCLE ENGINE

BACKGROUND OF THE INVENTION

This invention relates to an internal combustion engine and more particularly to an improved induction system for such engines which induction system is particularly adapted for use with four-cycle engines.

In many types of engines, the induction system includes, in addition the normal port control which communicates the intake passage with the combustion chamber, a check valve that is positioned upstream of the port control and which precludes reverse flow through the induction system. This type of arrangement is commonly used in 2-cycle engines, but also may be employed in four-cycle engines to achieve some of the same purposes. That is, in a 2-cycle engine, the port control of the intake port is achieved by the movement of the piston relative to the port. In a four-cycle engine, as is well known, the intake port is controlled by a valve that is operated in timed sequence with the engine crankshaft. However, with either type of engine, the use of a check valve may provide additional advantages in charging efficiencies because of its ability to preclude reverse flow.

Although the use of the check valves provides improved induction efficiency under some conditions, the resistance of the check valve to opening movement can, in some instances, restrict flow. Also, there is inertia in the intake system which must be overcome each time the check valve opens and closes and, thus, the air flow may be delayed from the time when the intake port is actually open.

It is, therefore, a principal object of this invention is to provide an improved induction system for an engine.

It is a further object of this invention to provide an improved induction system for engines embodying check valves in addition to the normal intake port control.

It is a further object of this invention to provide an arrangement wherein the flow through the intake passage may be continued even after the intake port is closed and when a check valve is in the induction passage.

In accordance with one feature of the invention, this latter effect can be achieved by providing a plenum chamber that is disposed between the check valve and the intake port. Thus, when the intake port is closed, the check valve may be retained open by the inertia of the airflow through the intake passage which existed at the time when the intake port closed. This inertial flow can then pass into the plenum chamber for introduction into the engine the next time the intake port is open. This obviously improves charging efficiency.

It is, therefore, a still further object of this invention to provide an improved induction system arrangement for an engine wherein a check valve is provided in the induction system, but flow past the check valve is permitted even when the intake port is closed.

Although it is possible to provide an additional and separate plenum chamber for the aforenoted purposes, it also is possible to employ the engine crankcase, if the engine is of the four-cycle type, as the actual plenum device.

It is, therefore, a still further object of this invention to provide such an induction system.

In addition to the improved induction of the engine by utilizing the crankcase chamber as a plenum chamber, still additional advantages can be enjoyed by using such an arrangement. For example, in addition to providing a volume into which the air can continue to flow when the intake port is closed, the crankcase chamber itself may act as a compressor. That is, when the piston is moving toward bottom dead center, the volume of the crankcase chamber is decreased. As a result of this, if the crankcase chamber is communicated with the intake passage, the charge compressed in the crankcase chamber can be delivered to the combustion chamber at an increased pressure. This provides, in effect, a supercharging function. However, under some circumstances, the increased pressure may be undesirable.

It is, therefore, a still further object of this invention to provide an improved induction system of this type wherein the crankcase chamber can act as a plenum chamber, but wherein an arrangement is incorporated for reducing the maximum pressure generated so as to avoid knocking and other objectionable loading on the engine.

It is well known that blow-by and crankcase ventilation gases tend to accumulate in the crankcase chamber. Systems have been provided for ventilating the crankcase chamber so as to avoid the build-up of these objectionable products in the crankcase chamber. This is desirable to ensure against oil contamination and also to ensure adequate ventilation for the engine. However, these crankcase ventilation gases and blow-by gases should not be discharged directly to the atmosphere.

There have been proposed, therefore, crankcase ventilating systems wherein the crankcase ventilating gases are delivered to the engine induction system. In this way, hydrocarbons and other objectionable crankcase ventilating gas components can be purified by combustion in the combustion chamber before they are discharged to the atmosphere. Frequently, the crankcase ventilation system delivers the crankcase ventilating gases to the induction system of the engine. Normally this is done at point upstream of the throttle valve and frequently into the air cleaner of the engine. However, this results in the possible discharge of crankcase gases to the atmosphere under at least some running conditions.

In accordance with a further object of this invention, the crankcase chamber is connected to the induction system in such a way as to achieve the aforenoted effects of improving charging efficiency, while, at the same time, providing an easy way in which the crankcase ventilation can be accomplished without the possibility of crankcase ventilating gases escaping to the atmosphere without having first been repassed through the combustion chamber.

SUMMARY OF THE INVENTION

A first feature of this invention is adapted to be embodied in an internal combustion engine having a combustion chamber with an induction system that delivers a charge to the combustion chamber. The induction system is comprised of an intake passage terminating at an intake port communicating with the combustion chamber. Control means selectively and sequentially open and close the intake port during a cycle of operation of the engine. A check valve is positioned in the intake passage upstream of the control means for permitting flow through the intake passage to the combustion chamber and for precluding reverse flow through the intake passage. Means form a plenum chamber volume that communicates with the intake passage between the check valve and the control means for accommodating continued flow through the intake passage downstream of the check valve after the control means closes the intake port.

Another feature of the invention as adapted to be embodied in a reciprocating engine having a combustion chamber and a crankcase chamber in which a crankshaft is journalled. An induction system delivers a charge to the combustion chamber. The induction system is comprised of an intake passage terminating at an intake port communicating with the combustion chamber and having an atmospheric inlet at one end thereof. Control means sequentially open and close the intake port during a cycle of operation of the engine. A check valve is positioned in the intake passage upstream of the control means for permitting flow through the intake passage to the combustion chamber and precluding reverse flow through the intake passage. A communicating passage communicates the crankcase chamber with the intake passage between the check valve and the control means for permitting ventilating gases from the crankcase chamber to be delivered directly to the combustion chamber and for precluding reverse flow to the atmosphere.

DETAILED DESCRIPTION OF THE PREFERRED EMBODIMENTS OF THE INVENTION

As should be apparent from the foregoing description, the invention has particular utility in conjunction with internal combustion engines of either of the two or four cycle type. However, for reasons which will become apparent, the invention has specific utility in conjunction with four-cycle engines and, for that reason, all of the embodiments illustrated show such four-cycle engines. It will be readily apparent, however, to those skilled in the art how certain facets of the invention may be employed with 2-cycle engines.

Also, since the invention deals primarily with the induction system and the control for the induction system, the actual components of the engine have been shown, for the most part, schematically. This is because, except for those features of the induction system which will be described in detail, the invention can be utilized in conjunction with any of the wide variety of types of engines. For the same reason, only a single cylinder of the engine has been illustrated in each embodiment. Those skilled in the art will readily understand how the invention can be employed in conjunction with multiple cylinder engines.

In addition, although the invention is described in conjunction with a reciprocating engine, certain features may also be employed with other types of engines, such as rotary engines. However, the invention is primarily useful in conjunction with engines which operate on a fixed cycle, such as, two or four cycle engines and wherein the flow through the intake passage is not continuous during a single cycle of operation.

Figure 1:
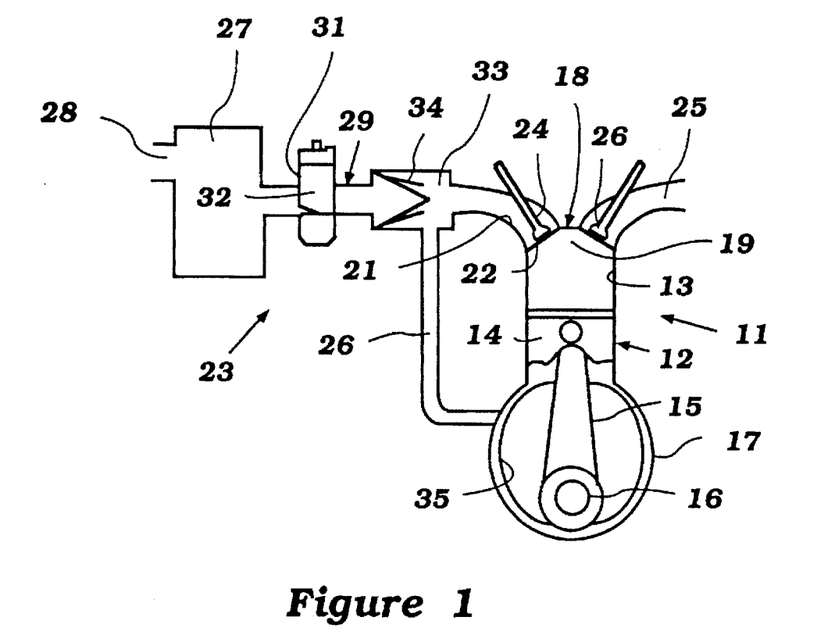
FIG. 1 is a partially schematic cross-sectional view taken through a single cylinder of an internal combustion engine constructed in accordance with an embodiment of the invention.

Referring first to the embodiment of FIG. 1, an internal combustion engine constructed in accordance with this embodiment is identified generally by the reference numeral 11. For the reasons aforenoted most, if not all, of the components of the engine 11 are shown schematically.

The engine 11 is comprised of a cylinder block 12 in which one or more cylinder bores 13 are formed. Pistons 14 reciprocate in each cylinder bore 13. The pistons 14 are connected by means of connecting rods 15 to a crankshaft 16. The crankshaft 16 rotates in a crankcase chamber defined by a crankcase member 17 that is affixed to the cylinder block 12 and by the skirt of the cylinder block.

A cylinder head assembly, indicated generally by the reference numeral 18, is affixed to the cylinder block 12 on the side opposite the crankcase member 17. The cylinder head 18 has a recess which cooperates with the cylinder bore 13 and the head of the piston 14 to form a variable volume chamber 19 which comprises the combustion chamber of the engine. The clearance volume at top dead center is defined primarily by the recesses in the cylinder head 18, as is well known in this art.

The cylinder head 18 is provided with one or more intake passage 21 each of which serves the combustion chamber 19 through a respected intake valve seat 22. An induction system, indicated generally by the reference numeral 23, serves the intake ports 22 in a manner which will be described.

A poppet-type intake valve 24 is supported in the cylinder head assembly 18 and cooperates with each intake port 22 for controlling the flow through it. As is well known in this art, the intake valves 24 are operated by any known type of valve actuating mechanism which opens and closes the intake valves 24 in timed sequence with the rotation of the crankshaft 16. An overhead camshaft and associated follower system may serve this function.

Exhaust passages 25 are formed in the cylinder head 18 on the side of the combustion chambers opposite the intake passages 21. These exhaust passages 25 have exhaust ports that are controlled by poppet-type exhaust valves 26 in a known manner. The specific number of exhaust passages 25 and exhaust valves 26 for each cylinder may be varied, as is known in the art.

One or more spark plugs (not shown) are mounted in the cylinder head 18 and fire the charge which is admitted to the combustion chambers 19 by the induction system 23. This burnt charge is then discharged through the exhaust passages 25.

Referring now specifically to the induction system 23, it is comprised of an air inlet device 27 which has an atmospheric air inlet 28 into which atmospheric air is indicted. The air inlet device 27 may provide a silencing and plenum chamber function. In addition, an air filter element (not shown) may be positioned in the air inlet device 27 for filtering the inducted air.

The air that has passed through the air inlet device 27 and its filter, if any, is delivered to an intake passage arrangement, indicated generally by the reference numeral 29 which forms a continuation of the cylinder head intake passage 21. These components thus, provide communication between the atmospheric air inlet 28 and the combustion chambers 19.

A charge former in the form of a carburetor 31 may be positioned in the induction passage 29 downstream of the air inlet device 27. In this embodiment, the charge former 31 is a sliding piston-type carburetor having a sliding throttle piston 32.

Downstream of the charge former 31, this is provided a valve chamber 33 in which a reed-type check valve 34 is provided. The reed-type check valve 34 permits flow through the induction passage when the intake valve 24 is open and the pressure downstream of the reed-type check valve 34 is below the pressure upstream of this valve. However, if the pressure reverses, the reed-type check valve 34 will preclude reverse flow.

From the foregoing description, it should be readily apparent that, when the intake valves 24 close, the air flow through the induction passage 29 will be abruptly halted and the reed-type check valve 34 will close. Hence, the flow inertia is discontinued and must be reestablished when the intake valves 24 are next open. This also requires a pressure difference across the reed-type check valves 34 and, thus, there will be some restriction to initial air flow. This adversely effects charging deficiency.

In accordance with the invention, therefore, there is provided a plenum chamber will communicates with the valve chamber 33 or the intake passage 29 downstream of the check valve 34. In this embodiment, this plenum chamber is formed by a crankcase chamber 35 in which the crankshaft 16 rotates. This crankcase 35 is communicated with the valve chamber 33 downstream of the valve element 34 by means of a communicating passageway 36.

With this arrangement, when the intake valve 24 closes, the piston 14 will have passed its bottom dead center position and be moving upwardly. Therefore, the volume of the crankcase chamber 35 will be increasing and a flow will continue through the reed-type valve 34, but will pass through the passage 36 and into the crankcase chamber 35 rather than into the combustion chamber 19. Hence, the inertial effect will maintain the reed-type check valve 34 open and this will reduce the load necessary to fully open the reed-type check valve 34 the next time the intake valve 24 opens. As a result, charging efficiency will be substantially increased.

Figure 2:
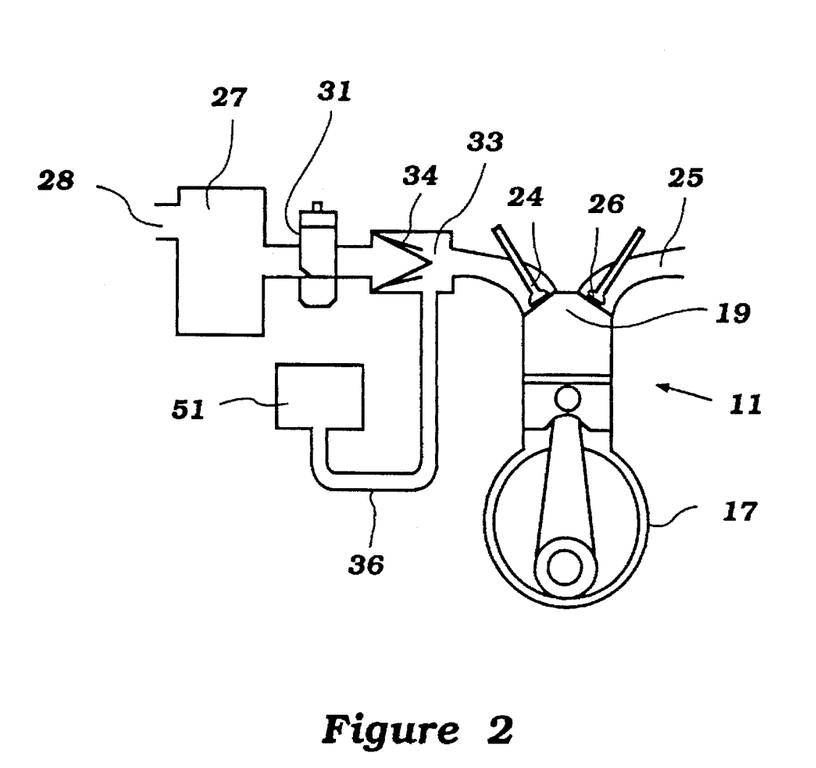
FIG. 2 is a partially schematic cross-sectional view, in part similar to FIG. 1, and shows a second embodiment of the invention.

FIG. 2 shows another embodiment of the invention that differs from the embodiment of FIG. 1 only in the way in which the plenum chamber for the intake charging efficiency improvement is formed. For that reason, components of this embodiment which are the same as the previously described embodiment have been identified by the same reference numerals and will not be described again, except insofar as is necessary to understand the construction and operation of this embodiment.

In this embodiment, a separate plenum chamber, indicated generally by the reference numeral 51 is provided with which the conduit 36 communicates. Hence, when the intake valve 24 closes, the inertial effect of the air flowing through the reed-type check valve 34 will continue and the air will flow through the conduit 36 into the plenum chamber 51. As a result, the advantages previously described will be enjoyed. That is, the inertial flow can continue and charging efficiency improved. In this embodiment, however, the volume of the plenum chamber 51 is fixed rather than expanding as would the crankcase chamber 35 of the previously described embodiment. The volume of the plenum chamber 51 is, however, made large enough so as to ensure that the continued air flow will occur.

FIGS. 3 through 6 show another embodiment of the invention which also has basically the same engine construction as the previously described embodiments. For that reason, components which are the same, or substantially the same, have been identified by the same reference numerals.

Figure 3:
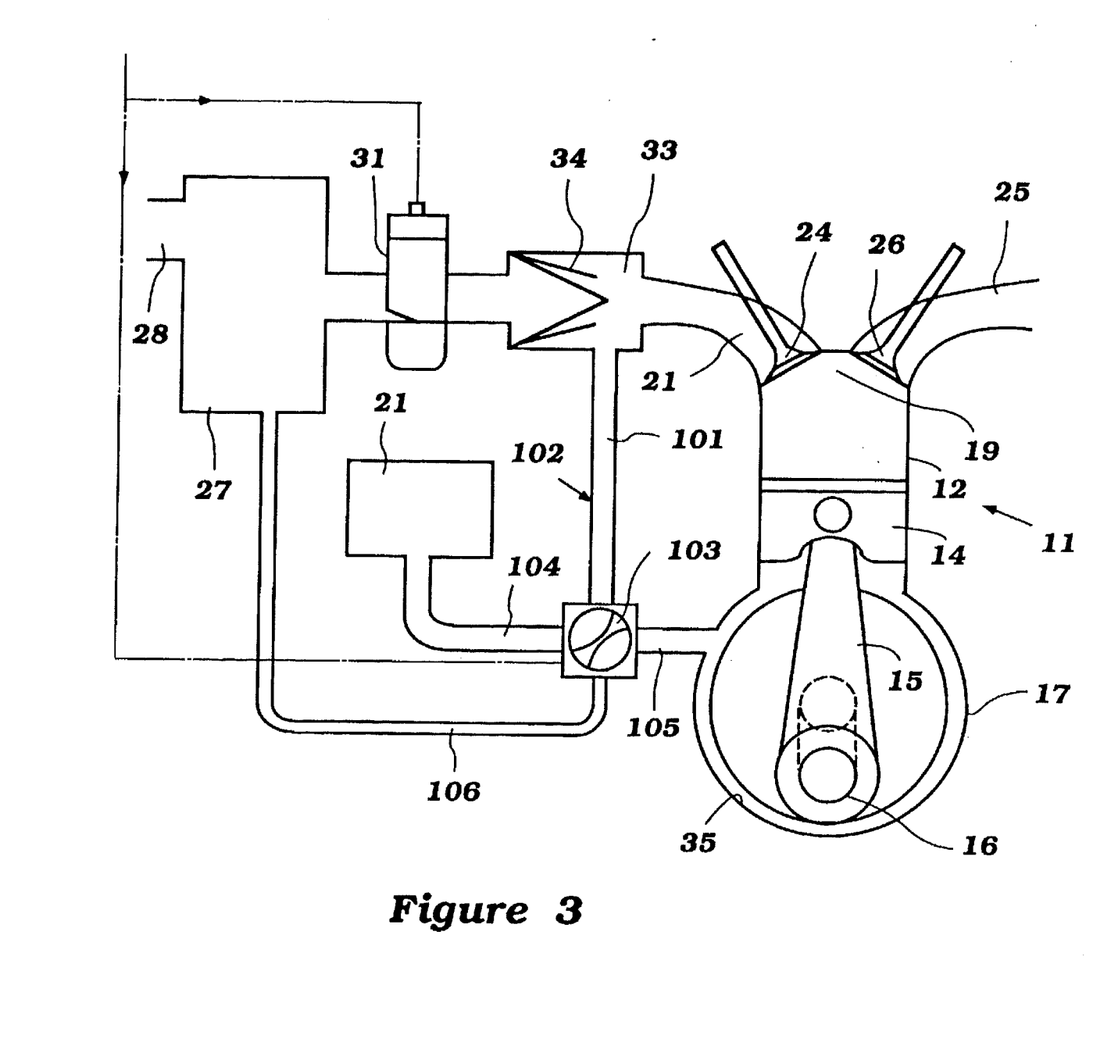
FIG. 3 is an enlarged scale, partially schematic cross-sectional view, in part similar to FIGS. 1 and 2, and shows another embodiment of the invention.

In this embodiment, the valve chamber 33 communicates with a branch passageway 101 of a communication system, indicated generally by the reference numeral 102. The branch passage way 101 terminates at a control valve 103 which selectively communicates the passageway 101 with either the plenum chamber volume 51 through a first branch passageway 104 or with the crankcase chamber 35 through a second branch passageway 105. In addition, the valve 103 selectively communicates either the crankcase chamber 35 or the plenum chamber 51 with atmospheric air pressure through a further branch passage way 106.

The branch passageway 106 communicates either directly through atmospheric air inlet or, more preferably, with the intake device 27. If the intake device 27 includes a filter element, the branch passageway 106 preferably communicates with the air inlet device 27 downstream of the filter element of the air inlet device 27.

Figure 4:
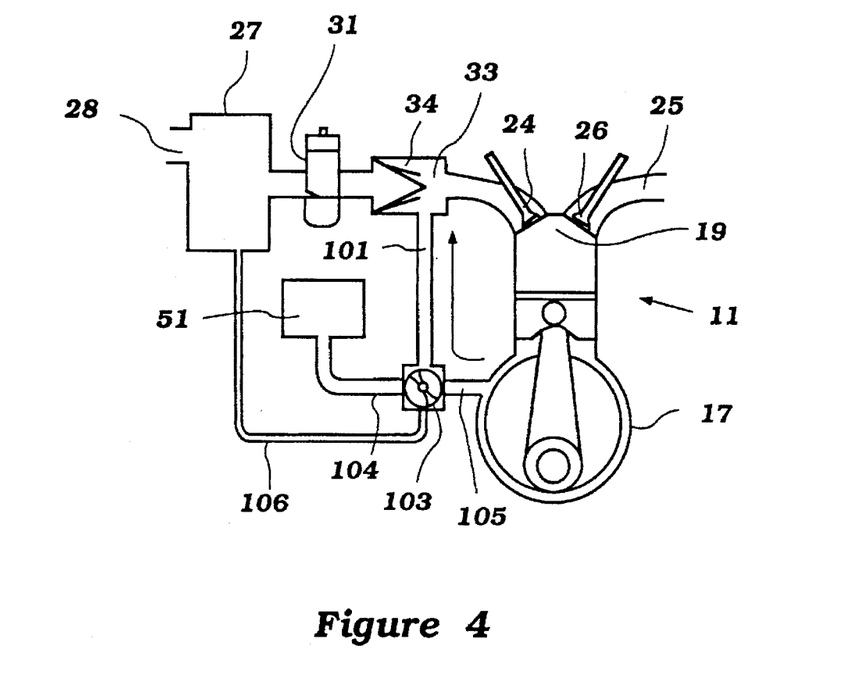
FIG. 4 is a view, in part similar to FIG. 3 but on a smaller scale, and shows a first-running condition.

FIG. 4 shows the condition of the valve 103 under a certain running condition when the crankcase chamber 35 communicates with the induction system. Under this condition, the plenum chamber 51 is communicated with the air inlet device 27 through the branch passageway 106 so that it can be recharged with fresh air. As will be described later, this position of the control valve 103 may be set under low speed and mid-range performance in some embodiments and under high speed conditions in other embodiments.

When the valve 103 is in this position, the flow continuation during the time when the intake valve 24 is closed will be achieved and also the supercharging effect, afore referred to will be enjoyed. Thus, when the valve 103 is in this position, the engine operates like the embodiment of FIG. 1.

In addition, when the control valve 103 is in the position shown in FIG. 4, the crankcase ventilating gases from the crankcase chamber 35 may be discharged into the combustion chambers 19 through the induction system 29. Hence, emission control is also achieved.

Figure 5:
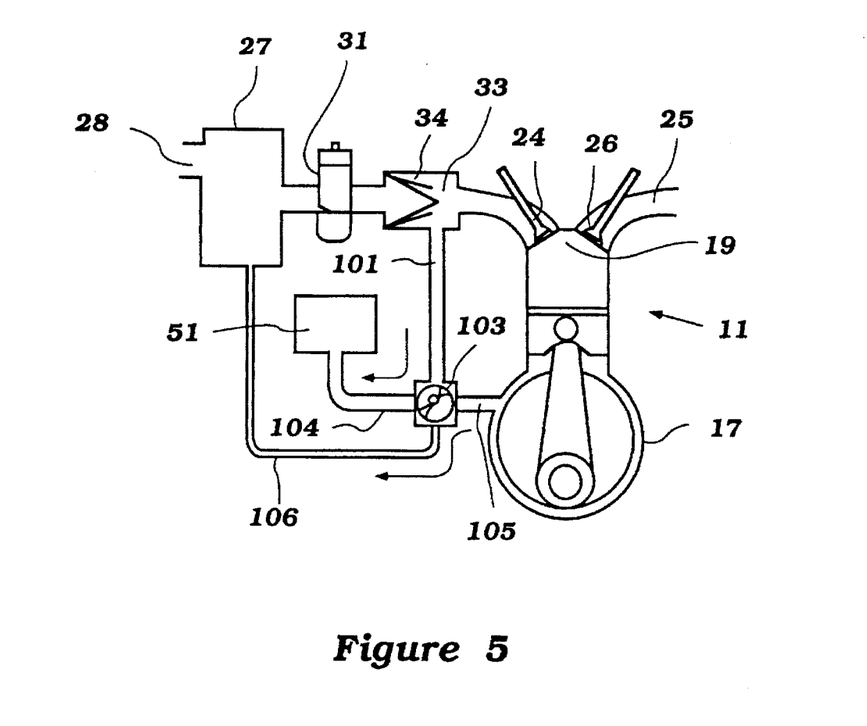
FIG. 5 is a view, in part similar to FIGS. 3 and 4 taken on the scale as FIG. 4 and shows another running condition of the engine.

When the control valve 103 is in the position shown in FIG. 5, then the plenum chamber 51 will serve the same function as in the embodiment of FIG. 2. In this position, however, the crankcase chamber 35 will communicate with the air inlet device 27 downstream of the filter element, if one is provided. Therefore, crankcase ventilation is possible with the crankcase ventilating gases being delivered to the induction system 29 as shown by the arrow in this figure.

Thus, by utilizing the control valve 103, it is possible to ensure good crankcase ventilation under all conditions and without the exhaust from the crankcase passing to the atmosphere regardless of the position of the control valve 103. In addition, the advantages of maintaining airflow and reducing inertial affects in the induction system are also obtained.

Figure 6:
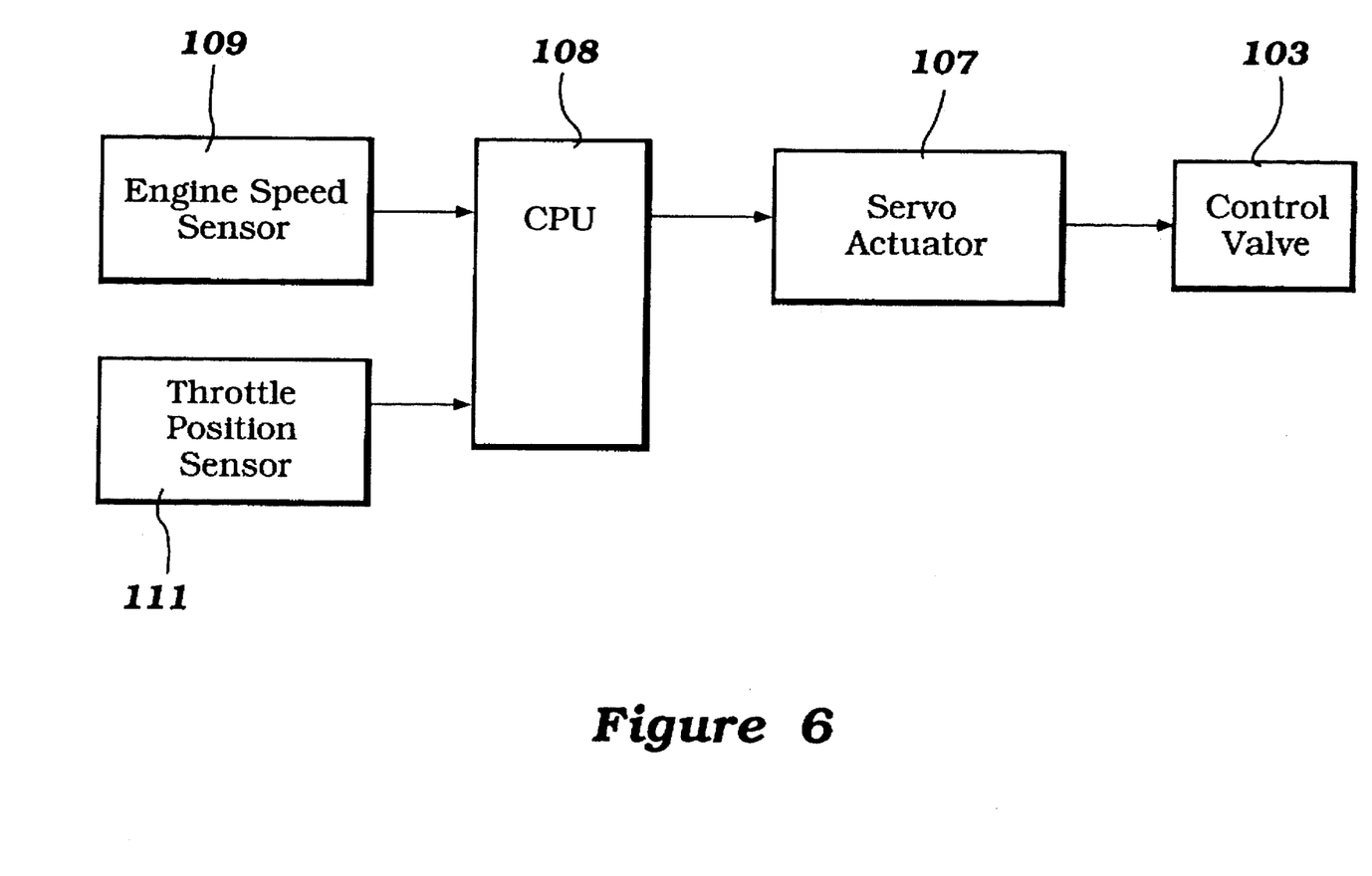
FIG. 6 is a schematic block diagram showing how the various elements of the engine are employed for controlling the control valve.

Although any of a variety of control strategies may be employed for the control valve 103, FIG. 6 shows one type of arrangement. In this arrangement the control valve 103 is operated by a servomotor, indicated schematically at 107. The servomotor 107 is, in turn, controlled by a controller or CPU 108. This controller 108 receives certain signals indicative of engine running conditions or operator demand. These signals may comprise an engine speed signal 109 derived from a pulser coil or the like associated with the crankshaft 16. In addition, a throttle position sensor 111 may be provided that cooperates with the throttle piston 32 to provide a signal indicative of operator demand or load.

As has been noted, the communication with the crankcase chamber 35 of the induction system 29 through the appropriate positioning of the control valve 103 has the effect of not only improving the flow through the induction system, but also obtaining a supercharging effect.

Under low and medium engine speeds and/or loads, the actual flow through the intake passage 29 is not as large, and hence, the increase in volume of the crankcase chamber 35 during this cycle improves the charging efficiency by in effect holding the reed valve 34 open for a longer time period. In addition, there will be a supercharging effect, as aforenoted, that will improve performance under these running conditions.

Under high-speed, high-load conditions, however, the added supercharging effect may produce high engine temperatures and knocking. Hence, by shifting the valve 103 to the position shown in FIG. 5 under this running condition, the supercharging effect will be eliminated, and knocking can be reduced. However, since the air flow velocity is higher under this condition, then the charging efficiency will still be improved merely by the use of the plenum chamber 51.

Thus, one way in which the system may be employed is to maintain the valve 103 in its FIG. 4 condition under low and mid-range running conditions and moving the valve to its FIG. 5 position under high-speed, high-load conditions. This can be accomplished in response to either of the outputs of the engine speed sensor 109 and/or the throttle position sensor 111.

Figure 7:
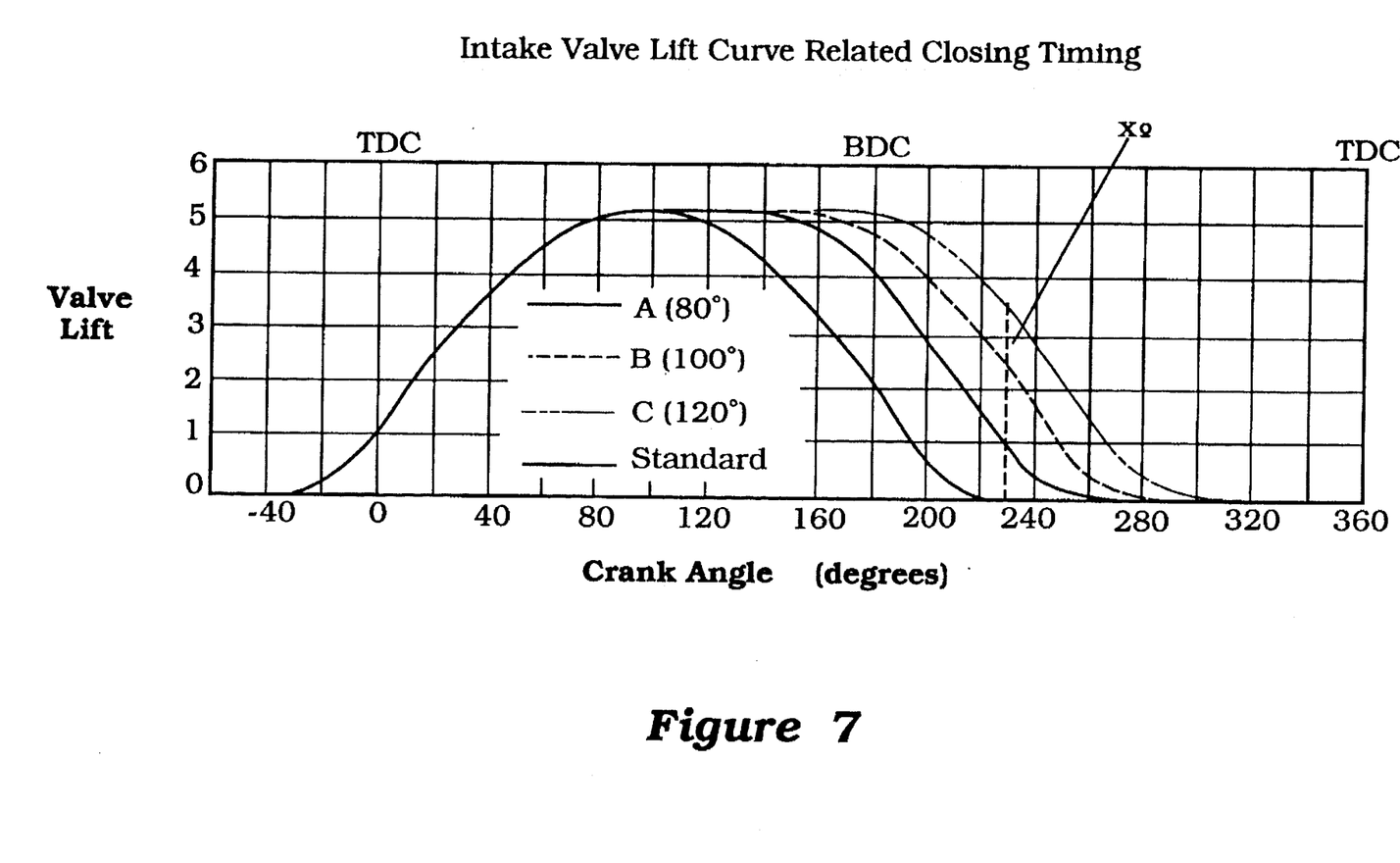
FIG. 7 is a graphical view showing how the intake valve timing may be varied to achieve certain results in accordance with additional embodiments of the invention.

By the use of the system shown in FIGS. 3-6, it is also possible to obtain still further performance advantages with this system if the intake valve closing is delayed from that normally used with engines having conventional induction systems. FIG. 7 shows several examples of how this may be accomplished.

The standard valve timing for opening and closing of the intake valve in response to crank angle is shown in this figure. It will be seen that the intake valve opens approximately 40° before top dead center and closes at approximately at 210° of crankshaft rotation or about 30° after bottom dead center in engines having conventional induction systems.

By using the induction systems embodying this invention it is possible to obtain even greater performance by delaying the closing of the intake valve to a point 40 or more degrees after bottom dead center, as shown by the curves A, B, or C, with the respective intervals being 80°, 100°, or 120° after bottom dead center. When this is done, the actual compression ratio is reduced. However, since the system can employ the crankcase as a supercharger, it is thus possible to not only increase the power, but also to reduce the likelihood of knocking. In addition, this permits the engine to have a large expansion ratio and high performance without the deleterious effects of knocking or the like.

This is accomplished by keeping the valve 103 in its FIG. 5 position under low and mid-range running and in its FIG. 4 position at high speeds and loads, so as to improve charging efficiency. Then the intake valve operating mechanism is set to delay the intake valve closing to a period at 70° or 80°. When this is done and under high speed conditions, the supercharging effect will offset the loss in compression ratio, and the expansion ratio can be maintained large. Thus, good power can be achieved without knocking.

The actual delay in the closing of the intake valve and the operation of the control valve 103 can be utilized to obtain the desired type of engine performance.

Figure 8:
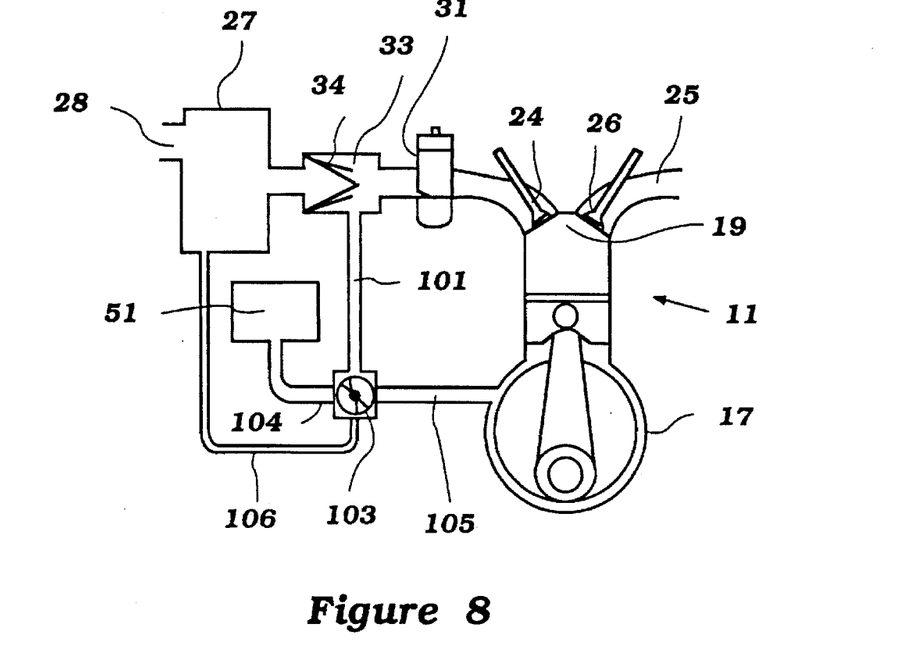
FIG. 8 is a partially schematic cross-sectional view, in part similar to FIGS. 1 through 5, and shows yet another embodiment of the invention.

In the embodiments as thus far described, the charge former in the form of the carburetor 31 has been disposed upstream of the reed-type check valve 34. The invention may, however, also be practiced in conjunction with arrangements wherein the charge former is positioned downstream of the check valve 34. FIG. 8 shows such an arrangement, and except for this location, this construction is the same as the embodiments of FIGS. 3-6. Therefore, like components have been identified by the same reference numerals and will not be described again.

In this embodiment the charge former or carburetor 31 is disposed between the valve chamber 33 and the engine intake valves 24. The communicating passage 101, which serves the control valve 103, is still fed off of the valve chamber 33, and thus is now upstream of the charge former 31, rather than downstream of it in the previously described embodiments.

Figure 9:
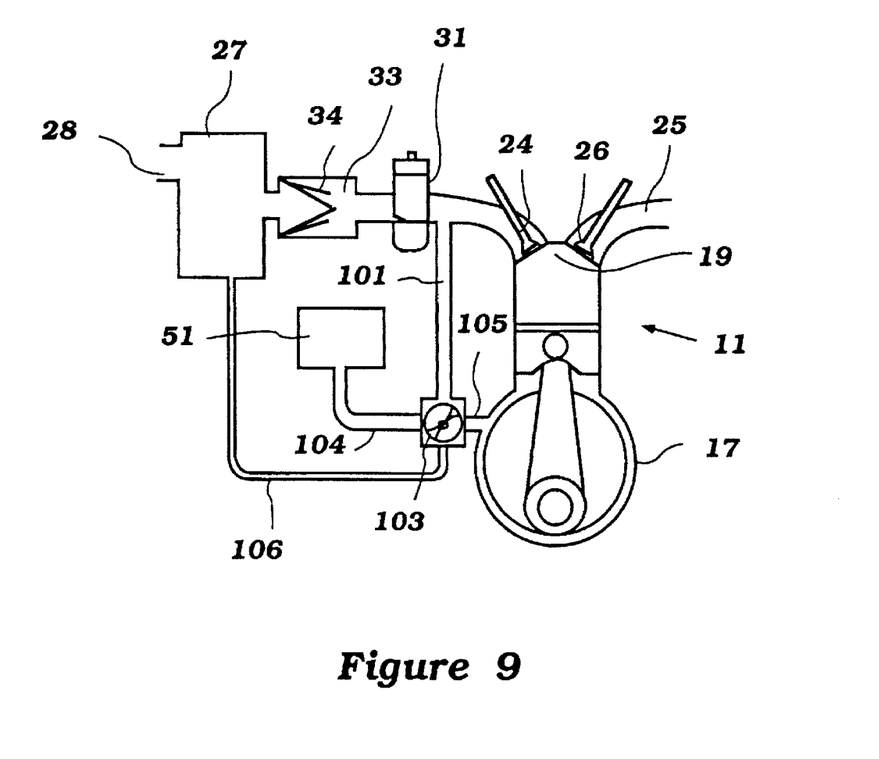
FIG. 9 is a partially schematic cross-sectional view, in part similar to FIGS. 1 through 5, and 8, and shows a further embodiment of the invention.

FIG. 9 shows another embodiment which, as noted, differs from that of FIGS. 3-6 and FIG. 8 only in the relative positions of the charge former 31 and the communicating conduit 101. In this embodiment the charge former 32 is again downstream of the check valve 34. However, the communicating passageway 101 is interconnected with the induction passage 29 downstream of the charge former 31.

In all embodiments thus far described, the charge former 31 has been a carburetor and specifically a carburetor of the sliding-piston type. It should be readily apparent to those skilled in the art that the invention may be employed in conjunction with other types of carburetors. In addition, the invention may be equally practiced with engines having fuel injection of either the manifold or direct type.

If manifold injection is employed, the fuel may be injected either in the position shown in the embodiments of FIGS. 1-6 or the position shown in the embodiments of FIGS. 8 and 9. That is, fuel may be injected either upstream of the check valve 34 or downstream of it. The communicating passage 101 may be disposed either upstream or downstream of the point of fuel injection if the fuel injector injects downstream of the check valve 34.

In addition to the changes already noted, it should also be noted that the delayed intake valve closing arrangement may be also utilized with the embodiments of FIGS. 1 and 2, and also that the passageway 106 for selectively communicating the crankcase chamber 35 with the air inlet device 27 upstream of the check valve 34 may also be utilized with the embodiment of FIG. 2. Various other changes and modifications may be made without departing from the spirit and scope of the invention, as defined by the appended claims.

What is claimed is:

1. An internal combustion engine having a combustion chamber, an induction system for delivering a charge to said combustion chamber, and a crankcase chamber, said induction system comprising an intake passage terminating at an intake port communicating with said combustion chamber, control means for sequentially opening and closing said intake port dating a cycle of operation of said engine, a check valve in said intake passage upstream of said control means for permitting flow through said intake passage to said combustion chamber and precluding reverse flow through said intake passage, and means for communicating with said crankcase chamber, said intake passage between said check valve and said control valve means for accommodating continued flow through the portion of said intake passage downstream of said check valve therefrom into said crankcase chamber after said control valve means closes said intake port.

2. An internal combustion engine as set forth in claim 1, wherein the engine operates on a four-cycle principle.

3. An internal combustion engine as set forth in claim 2, wherein the control means comprises an intake valve operated in timed relationship to the engine crankshaft.

4. An internal combustion engine as set forth in claim 1, further including a charge former for supplying a fuel-air mixture to the intake passage positioned upstream of the check valve.

5. An internal combustion engine as set forth in claim 1, further including a charge former for supplying a fuel-air mixture to the intake passage downstream of the check valve.

6. An internal combustion engine as set forth in claim 5, wherein the crankcase chamber communicates with the intake passage between the charge former and the check valve.

7. An internal combustion engine as set forth in claim 5, wherein the crankcase chamber communicates with the intake passage between the charge former and the intake port.

8. An internal combustion engine as set forth in claim 3, wherein additional air is drawn into the crankcase chamber after the intake valve is closed for creating a supercharging effect to the intake charge.

9. An internal combustion engine as set forth in claim 8, further including a control valve for selectively controlling the communication between the crankcase chamber and the intake passage.

10. An internal combustion engine as set forth in claim 9, wherein the control valve is movable between a first position for communicating the crankcase chamber with the induction system at a position downstream of the check valve and a second position for communicating the crankcase chamber with the induction passage upstream of the check valve.

11. An internal combustion engine as set forth in claim 9, wherein the control valve is movable between a first position for communicating the intake passage with the crankcase chamber and a second position for communicating the intake passage with another form of plenum chamber.

12. An internal combustion engine as set forth in claim 11, wherein the other form of plenum chamber comprises an air inlet device for the engine.

13. An internal combustion engine as set forth in claim 11, wherein the other form of plenum chamber comprises a separate closed plenum chamber.

14. An internal combustion engine as set forth in claim 11, wherein the control valve in the second position communicates the crankcase chamber with a point in the induction system upstream of the check valve.

15. An internal combustion engine as set forth in claim 10, wherein the upstream position is contiguous to an atmospheric air inlet of the induction system.

16. An internal combustion engine as set forth in claim 11, wherein the control valve is controlled in response to an engine running condition.

17. An internal combustion engine as set forth in claim 16, wherein the control valve is positioned in its first position under low and mid-range engine speeds and loads and in its second position under high-speed engine speeds and loads.

18. An internal combustion engine as set forth in claim 17, wherein the closing of the intake valve is delayed.

19. An internal combustion engine as set forth in claim 18, wherein the intake valve is not closed until more than 40° after bottom dead center.

20. An internal combustion engine as set forth in claim 19, wherein the intake valve is closed in the range of about 70°–80° after bottom dead center.

21. An internal combustion engine as set forth in claim 16 wherein the control valve is positioned in its first position under high engine speeds and loads and in its second position under low and mid-range engine speeds and loads.

22. An internal combustion engine as set forth in claim 21 wherein the closing of the intake valve is delayed.

23. An internal combustion engine as set forth in claim 22 wherein the intake valve is not closed until more than 40° after bottom dead center position.

24. An internal combustion engine as set forth in claim 23 wherein the intake valve is closed in the range of about 70° to 80° after bottom dead center.

25. An internal combustion engine having a combustion chamber, a crankcase chamber in which a crankshaft rotates, an induction system for delivering a charge to said combustion chamber, said induction system comprising an intake passage terminating at an intake port communicating with said combustion chamber, intake valve means for sequentially opening and closing said intake port during a cycle of operation of said engine and operated in timed relationship to said crankshaft, a check valve positioned in said intake passage upstream of said intake port for permitting flow through said intake passage to said combustion chamber and for precluding reverse flow through said intake passage, and crankcase ventilation control means comprising control valve means for selectively communicating said crankcase chamber with said induction system upstream or downstream of said check valve.

26. An internal combustion engine as set forth in claim 25, wherein the control valve is controlled in response to an engine running condition.

27. An internal combustion engine as set forth in claim 26, wherein the control valve is positioned in a first position under low and mid-range engine speeds and loads and in a second position under high-speed engine speeds and loads.

* * * * *